US007278889B2

(12) United States Patent
Muench et al.

(10) Patent No.: US 7,278,889 B2
(45) Date of Patent: Oct. 9, 2007

(54) SWITCHGEAR USING MODULAR PUSH-ON DEADFRONT BUS BAR SYSTEM

(75) Inventors: Frank Muench, Waukesha, WI (US); Brian Steinbrecher, Brookfield, WI (US)

(73) Assignee: Cooper Technology Company, Houston, TX (US)

( * ) Notice: Subject to any disclaimer, the term of this patent is extended or adjusted under 35 U.S.C. 154(b) by 0 days.

(21) Appl. No.: 10/326,890

(22) Filed: Dec. 23, 2002

(65) Prior Publication Data

US 2004/0121657 A1    Jun. 24, 2004

(51) Int. Cl.
   *H01R 11/09*    (2006.01)
(52) U.S. Cl. ...................................... 439/729
(58) Field of Classification Search ............... 439/723, 439/480, 89, 921, 181, 183, 729, 157, 160, 439/281; 174/149; 361/611, 605, 650; 218/155
   See application file for complete search history.

(56) References Cited

U.S. PATENT DOCUMENTS

| | | | | |
|---|---|---|---|---|
| 4,353,611 | A * | 10/1982 | Siebens et al. | ............... 339/92 |
| 4,638,403 | A | 1/1987 | Amano et al. | |
| 4,688,013 | A | 8/1987 | Nishikawa | |
| 4,767,894 | A * | 8/1988 | Schombourg | ............... 174/106 |
| 5,045,968 | A | 9/1991 | Suzuyama et al. | |
| 5,427,538 | A * | 6/1995 | Knapp et al. | ............... 439/157 |
| 5,846,093 | A * | 12/1998 | Muench et al. | ............... 439/89 |
| 6,227,908 | B1 * | 5/2001 | Aumeier | ............... 439/607 |
| 6,364,216 | B1 * | 4/2002 | Martin | ............... 239/281 |

FOREIGN PATENT DOCUMENTS

EP         062494 A2    11/1994

OTHER PUBLICATIONS

PCT International Search Report, May 5, 2004, 6 pages.
G&W Electric Co.; "Breakthrough in Switching Technology; Solid Dielectric Switchgear"; Oct. 2001; Blue Island, IL.
Cooper Power Systems; "Padmounted Switchgear; Type RVAC, Vacuum-Break Switch, Oil-Insulated or $SF_6$-Insulated; Electrical Apparatus 285-50"; Jul. 1998.
Cooper Power Systems; "Padmounted Switchgear; Type MOST Oil Switch; Electrical Apparatus 285-20"; Jul. 1998.
Cooper Power Systems; "Molded Rubber Products; 600 A 35 kV Class Bol-T™ Deadbreak Connector; Electrical Apparatus 600-50"; Jan. 1990.
Cooper Power Systems; "Padmounted Switchgear; Kyle® Type VFI Vacuum Fault Interrupter; Electrical Apparatus 285-10", Jan. 1998.
G&W Electric Co.; "Switchgear Terminations Splices Current Limiting Devices, Universal Splicing System"; pp. 27-29; 1988.
Supplementary European Search Report; Application No. EP.03800050.1;Jul. 27, 2007;3 pages.

* cited by examiner

*Primary Examiner*—Alexander Gilman
(74) *Attorney, Agent, or Firm*—Fish & Richardson P.C.

(57) ABSTRACT

Improved switchgear is disclosed that includes a bus bar system that can be assembled from modular parts. The bus bar system includes modules, such as high-voltage cables, connectors coupled to the cables and a third cable-less bus bar that is assembled using mechanical and/or push-on connections. By using these types of bus bars, various configurations, orientations of phase planes, and sizes of bus bar systems may be assembled. The connectors and cable-less bus bar may include either push-on connection points, mechanical connections points or a combination of both. The bus bars may themselves include insulation and semi-conductive shields. The improved switchgear may also include solid insulation, such as EPDM rubber, to insulate the bus bar system from the exterior surfaces of the switchgear.

82 Claims, 12 Drawing Sheets

SWITCHGEAR USING MODULAR PUSH-ON DEADFRONT BUS BAR SYSTEM

TECHNICAL FIELD

This document describes a completely deadfront pad or vault mounted switchgear, and more particularly to a bus bar and insulation system inside the switchgear.

BACKGROUND

Utility companies distribute power to customers using a network of cables, switching stations and switchgear. Switchgear is high voltage (e.g. 5 kV-38 kV) equipment, typically subsurface, vault, or pad mounted and used to distribute and control power distribution in relatively small areas. Historically, switchgear is a box or container that includes bushings, insulation, a bus bar system and a collection of active switching elements. An active switching element is a device with an internal active component, such as a fuse, a switch, or an interrupter, and external points of connection. In some active switching elements, these external points of connection are bushings. Active switching elements are used to automatically, manually, or remotely open and/or close a circuit. It should be noted that active switching elements that include switches or interrupters often include contacts in a vacuum, air, insulating oil, or dielectric gas. Distribution cables are coupled to the bushings of the switchgear and have the capacity to transmit power at high voltages. The bushings in turn are coupled to, or form an integral part of, the active switching elements inside the switchgear. The active switching elements are coupled by a bus bar system to create the switchgear.

FIG. 1 shows a common switchgear configuration 100 with source side door 110 in an open position. Latch(es) 111a and/or 111b are used to lock source side door 110 in a closed position. Inside door 110 is a front-plate 130 that forms one side of the container. In FIG. 1, the front-plate 130 is a vertical surface of the container. Coming up from the bottom of switchgear 100 are cables 112a-112f that each typically carry power in three phases from two different sources. More specifically, cables 112a-112c carry, respectively, the A, B and C phases of power from source 1, and cables 112d-112f carry, respectively, the C, B and A phases of power from source 2.

Cables 112a-112f are coupled to front-plate 130 and switchgear 100 through connectors 114a-114f. A connector or connector body is a component for connecting a power cable or bus bar to a bushing. Connectors can be straight or bent, live-break or dead-break, load-break, bolted, or probe and contact. Connectors 114a-114f are coupled to bushings extending through the front-plate 130. These bushings are coupled to active switching elements inside switchgear 100. The bushings represented in FIG. 1 are in a single plane that is horizontal to the pad. An exemplary connector is the "PUSH-OP™ Dead break Connector Catalog No. 600-13" manufactured by Cooper Power Systems, the specification of which is incorporated by reference. An exemplary bushing is Cooper Power System's "600 A 15 and 25 KV Class Deadbreak PUSH-OP™ Apparatus Bushing" (Electrical Apparatus Catalog No. 800-46), the specification of which is incorporated by reference.

Additional features may include switch handles 116a and 116b that operate switches (the active elements) inside switchgear 100 to disconnect and connect the bushings extending through front-plate 130 from the internal bus bar system. The cables 112a-112c may be disconnected from internal bus bar system by manipulating handle 116a. Similarly, cables 112d-112f may be disconnected from the internal bus bar system by manipulating handle 116b. Handles 116a and 116b are mounted onto front-plate or working surface 130 as shown in FIG. 1. It should be noted that alternative switchgear may use alternative active switching elements such as fault interrupters and fuses. It should also be noted that the front-plate or working surface 130 is a plane on the switchgear 100.

One use of switchgear is to segregate a network of power distribution cables into sections. That is, by manually opening or closing a switch (either locally or remotely), such as the switch coupled to handle 116a, the power supplied from one source to the switchgear is prevented from being conducted to the other side of the switchgear and/or to the bus. Similarly, when switch 116b is opened, power on one side of the switchgear is prevented from being conducted to the other side of the switchgear and to the bus and the taps. In this manner, a utility company is able to segregate a portion of the network for maintenance, either by choice, through the opening of a switch, or automatically for safety, through the use of a fuse or fault interrupter, depending on the type of active switching elements included in the switchgear.

FIG. 2 shows switchgear 100 with tap side door 220 open. Latch(es) 211a and/or 211b are used to lock tap side door 220 in the closed position. Inside door 220 is a front-plate or working surface 240, which is also one vertical side of the container. Coming up from the bottom of switchgear 100 are typically six cables 212a-212f that each typically carry one phase of power away from switchgear 100. In particular, cable 212a carries A phase power, cable 212b carries B phase power and cable 212c carries C phase power. Similarly, cable 212d carries C phase power, cable 212e carries B phase power and cable 212f carries A phase power. Connectors 214a-214f connect cables 212a-212f to switchgear 100 through bushings (not visible in this figure). Exemplary connectors and bushings can be the same as those described in conjunction with FIG. 1. It should be noted that the exemplary switchgear in FIGS. 1 and 2 shows one type of phase configuration. The phase configuration shown in FIGS. 1 and 2 is ABC CBA. Other phase configurations include AA BB CC. Still other configurations have one or more sources and taps on the same front plate or each on its own front plate or on the sides of the switchgear on one or more additional front plates. It should also be noted that each phase may be designated by a number, such as 1, 2 and 3, and that the switchgear may accommodate more that three phases of power. Thus, a switchgear may have a configuration of 123456 654321.

It should also be noted that there are other places at which to locate the bushings on the switchgear. The orientation of the bushings, whether mounted onto the front, side, top or back of a frame, and thereby protruding toward an exterior working space of the switchgear, is called the bushing plane. For the switchgear shown in FIGS. 1 and 2, the front plates 130 and 240 are two bushing planes for the switchgear 100.

One structure not shown in FIGS. 1 and 2 is a frame. A frame is internal to the switchgear and provides support for the active switching elements as well as the bus bar system. In other words, the frame holds the active switching elements and bus bar system in place once they are coupled to the frame. The frame is oriented to allow portions of the active switching elements, typically bushings, to protrude as a bushing plane so that connections to cables can be made.

A way is a three-phase or single-phase circuit connection to a bus, which contains combinations of switches and/or protective devices. A way may carry power in either a single-phase system or a multi-phase system. The circuit connection may or may not include active switching elements. The switchgear shown in FIGS. 1 and 2 is four-way or 4W. That is, the switchgear has connections for two sources and two protected taps.

Handle 216a operates switches inside switchgear 100 to disconnect cables 212a, 212b and 212c from the internal bus bar system. Similarly, handles 216b-216d each operate a switch inside switchgear 100 to disconnect and connect, respectively, one of individual cables 212d-212f from the internal bus bar system. Alternate switchgear can use other active switching elements such as fuses and fault interrupters.

If fuses were implemented instead of switches, the switch handles shown in FIG. 1 would be replaced by hot stick operable to access removable fuse wells that extend through front-plate 240 to allow a technician to access and/or replace the fuse.

A cut-away side view of switchgear 100 is shown in FIG. 3. As previously described, switchgear 100 in this example includes switching and/or protective devices 305 and 310 and a bus bar system 315. Devices 305 and 310 include bushings 305a and 310a for coupling to connectors 114a and 214f. Devices 305 and 310 also include bushings 305b and 310b for coupling to bus bar system 315. It should be noted that bushings 305a, 305b, 310a and 310b may be integral to or separate from switching and/or protective devices 305 and 310 and they may include mechanical or push-on connectors. A mechanical connector connects two or more metallic elements by using threaded, crimp, or wedge connections. Typical mechanical bus connections consist of two or more conductors made from bars or braids which are secured together with a threaded bolt extending through holes in a flattened portion and secured by a bolt and a conductive member with internal threads. A typical mechanical connector to a flat bus conductor surface is accomplished by threading a conductive member with internal threads onto a threaded stud or a bolt. Push-on connectors consist of two or more metallic bus conductors that can be axially joined. The components consist of a matching set of probes, rods, or 'male' conductors that mate with finger-contacts, bores, or 'female' conductors or contacts.

FIG. 4 shows a cross sectional front view of a conventional bus bar system 315. Conventional bus bar system 315 includes three copper, aluminum or other electrically conductive metal bars 415a, 415b and 415c. As shown in FIG. 4, metal bar 415a is formed or bent around metal bar 415b and metal bar 415b is similarly formed or bent around metal bar 415c. The metal bars may be flexible or partially flexible to allow connection to two rigid members. The purpose of bus bar system 315 is to conduct power from the source side active switching elements to the tap side active switching elements. Thus, if one of the active switching elements opens such that a source side or tap side cable is disconnected from the bus bar system, the remaining source and tap side cables remain connected and can transmit power.

Insulation is provided between the bus bars and the active switching elements to prevent electrical arcing. There are three common types of insulation typically used in conventional switchgear: oil, sulfur hexafluoride ($SF_6$) gas, and air. Each type of insulation insulates each part of the switchgear from the other parts of the switchgear (bus bar and active switching elements), and from the outer surfaces of the container of the switchgear.

SUMMARY

A completely deadfront switchgear is made from a bus bar system that is itself deadfront. To be deadfront, the bus bars include shields that are coupled to ground. This allows for the switchgear to be made smaller by eliminating the previously required spacing between the bars and the active switching elements for conventional types of insulation. More specifically, the bus bars and push-on connectors include insulation and semiconducting shields. When a bus bar is coupled to an active switching element that also includes a semiconducting shield that is coupled to ground, the bus bar and the active switching elements are themselves deadfront. This makes the switchgear that includes the bus bar deadfront as well, whether or not the outer surface of the switchgear (i.e., the box) is coupled to ground. This in turn means the switchgear can be manufactured without air, oil, or $SF_6$ insulation while maintaining the highest degree of safety.

Switchgear that includes solid dielectric insulation between the bus bars and the active switching elements is also described. By using a solid dielectric, the spacing between the bus bars may be reduced, which allows for the design of switchgear with a smaller footprint. In addition, conventional switchgear that use oil or $SF_6$ insulation requires a container within the switchgear to prevent these materials from leaking out of the switchgear and into the environment. Switchgear that uses solid insulation materials does not require such a container as the very nature of the solid insulation prevents the insulation from leaking out of the switchgear.

Another switchgear is described that uses bus bars with push-on connections. These push-on connections make it easier for connections to be made to the active switching elements. In addition, push-on connections are used in assembling the bus bars so that a bus bar system can be made to desired specifications in a short amount of time, without the need for expensive equipment. In addition, push-on connections can be used to make bus and active switching element connections in switchgear configurations that can't be easily done with mechanical connections. Finally, the use of push-on connections eliminates threaded and other mechanical connections and allows for faster and easier replacement of switchgear components.

This completely deadfront solid dielectric switchgear includes active switching elements and bus bars that are completely high voltage shielded, with a solid dielectric insulation system and a fully rated conductive ground shield. This deadfront equipment has no voltage on its exposed surfaces and thereby avoids the potential for burning and degradation of the surfaces that may result from such a voltage. In one general aspect, an improved, solid-dielectric, modular, bus bar system is made from high voltage connectors and high voltage cables. This solid dielectric bus bar and active element system eliminates the need for oil, $SF_6$ or air insulation by creating completely shielded, solid dielectric switchgear. In addition, solid insulation switchgear does not have the risk of internal contamination from plants and animals that may be associated with air insulated switchgear.

In accordance with one implementation, switchgear includes a surface for mounting an active switching element that is coupled to a bus bar that includes a cable coupled to a connector.

In accordance with another implementation, a bus bar includes two individual legs coupled together. The connections in each of the legs may be push-on, mechanical, or a combination of both. This bus bar also allows for non-coplanar connections.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 5:
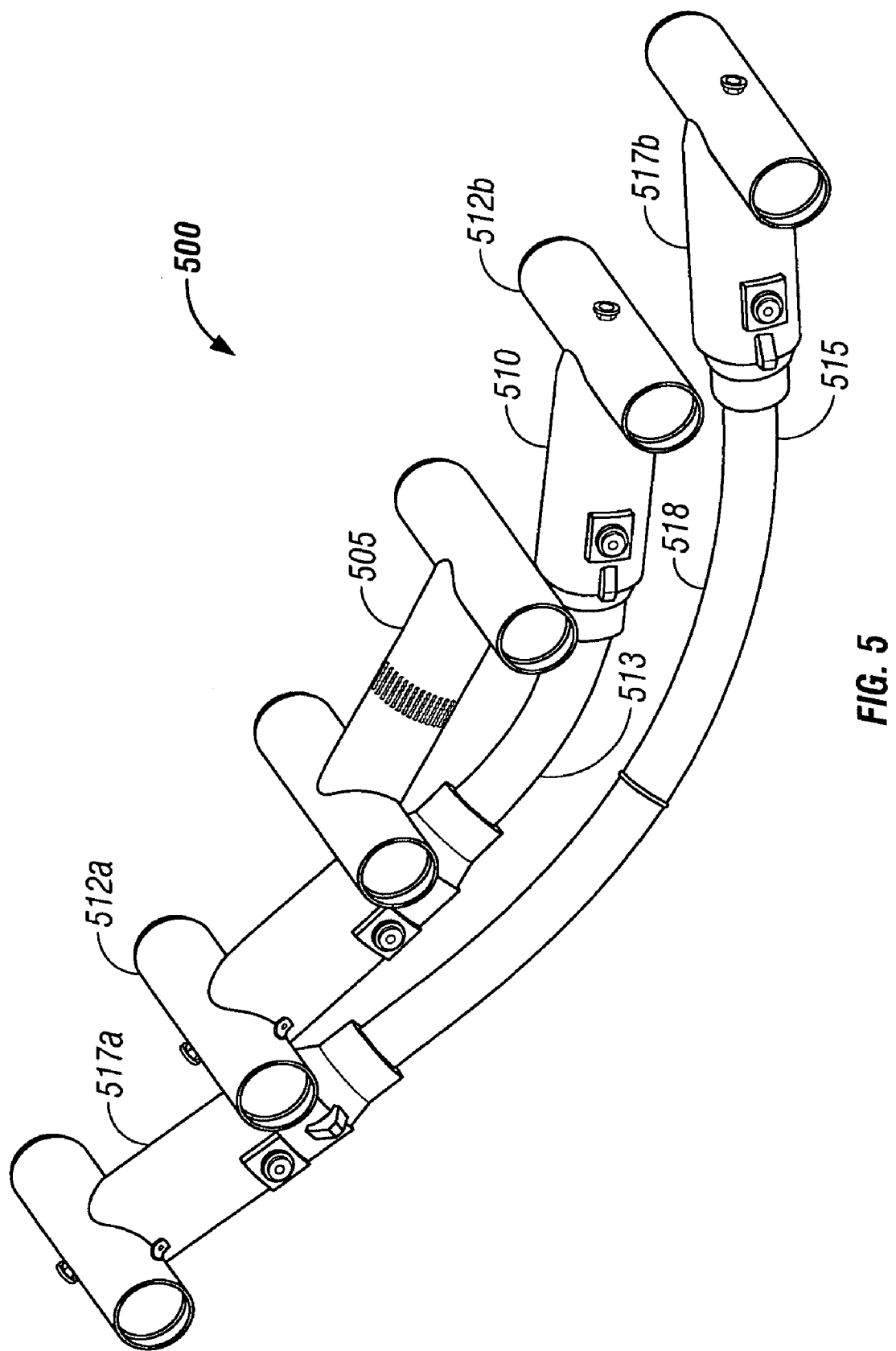
FIG. 5 is a perspective view of a solid dielectric, modular deadfront bus bar system.

As shown in FIG. 5, an exemplary bus bar system 500 includes three bus bars 505, 510 and 515. Bus bar 510 includes a pair of connectors 512a and 512b coupled to a cable 513. Bus bar 515 includes a pair of connectors 517a and 517b coupled to a cable 518. A cable typically is a group of concentrically-wound, shielded wires wrapped in insulation, capable of transmitting high voltage power, and covered by a conductive, grounded outer surface. A connector is an assembly of conductive elements that electrically and physically couples two elements together. In some implementations, a connector includes a protective sheath that may include a corona shield, insulation and a semi-conducting grounded shield.

Figure 6:
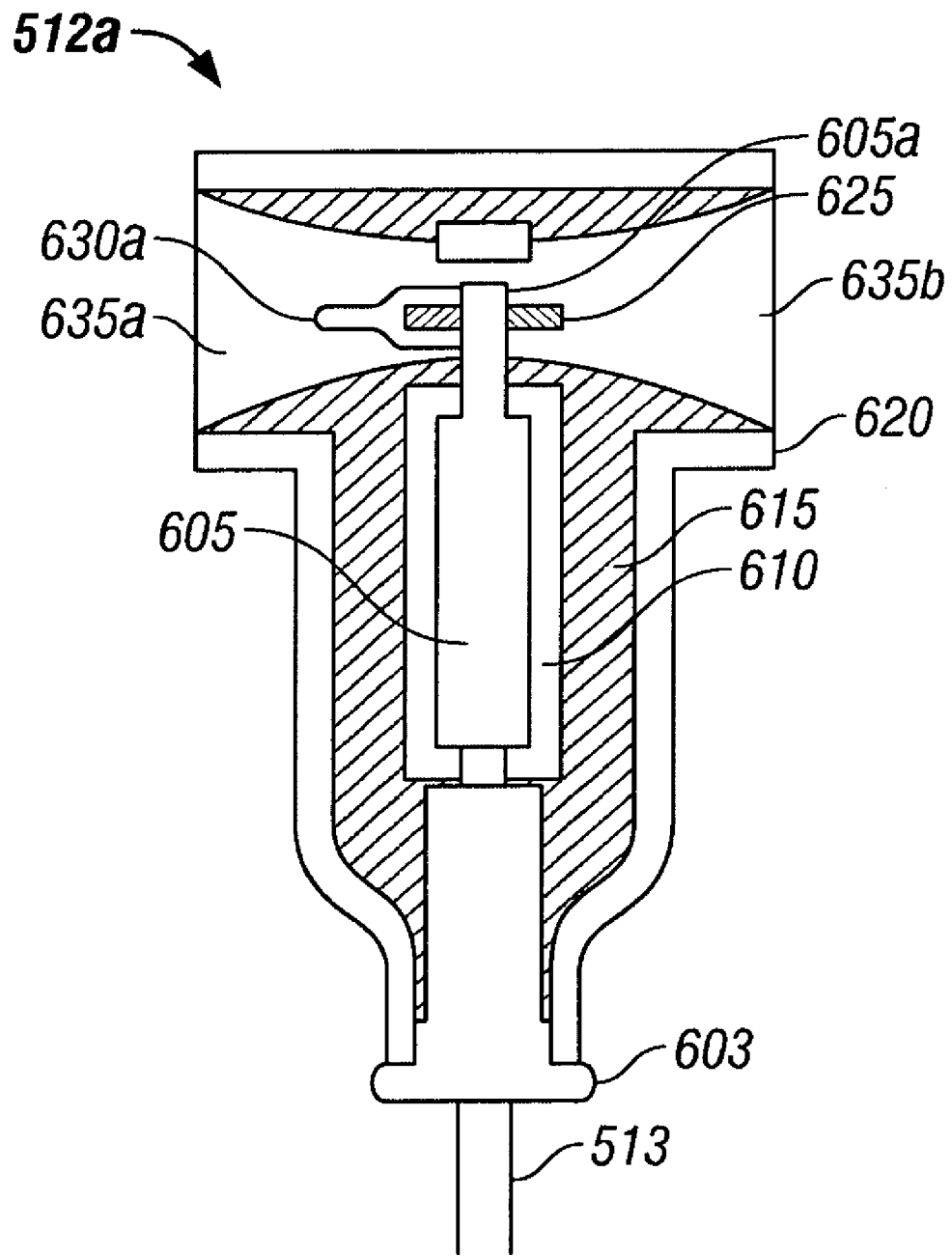
FIG. 6 is a cross-sectional view of a connector of the bus bar system of FIG. 5.

As shown in FIG. 6, cable 513 is coupled to connector 512a by a compression connector 605. In one implementation, cable 513 is coupled to compression connector 605 by a compression threaded connection. That is, connector 512a is coupled to cable 513 by crimping connector onto cable 513. The crimping of the connector onto cable 513 provides mechanical support so that the connection between the cable 513 and the connector 512a cannot be pulled apart easily.

Connector 512a also includes a cable adapter 603. Cable adapter 603 adjusts or tightens around cable 513 to fit cable 513 onto connector 512a.

A semi-conducting insert 610 surrounds compression connector 605. The semi-conducting insert 610 provides corona-free electrostatic shielding of compression connector 605. Insulation 615 surrounds semi-conducting insert 610. In one implementation, insulation 615 is made from ethylene propylene diene monomer (EPDM) rubber.

A semi-conducting shield 620 surrounds insulation 615. The semi-conducting shield 620 may be coupled to ground to conduct to ground any stray charges. When the shield 620 is coupled to ground, the bus bar is deadfront, which improves upon the insulative and protective features of connector 512a.

An eye 605a is located at one end of compression connector 605; threaded stud 625 passes through eye 605a. Probe 630a is threaded onto threaded stud 625 and makes contact with bushings coupled to an active switching element (not shown) to complete the electrical connection(s) to cable 513. The probe 630a is a connection point for making electrical connections used in making push-on connections. Threaded stud 625 is another connection point and makes a mechanical connection with a bushing coupled to an active switching element (not shown) by threading onto threaded stud 625. Spaces 635a and 635b in insulation 615 and semi-conducting shield 620 facilitate electrical connections to the bushings coupled to an active switching element (not shown) and the probe 630a and threaded stud 625.

Connector 512a shows two types of connections. Probe 630a is a connection point and is one-half of a push-on connection. The other half of the connection, such as, for example, a female finger contact, completes the electrical connection upon being pushed onto probe 630a. The female finger contact is another connection point. The two together are an example of a push-on connection.

Threaded stud 625 is another connection point that makes up one half of a connection. The other half of the connection is a conductive member made of conductive material with internal threads into which the threaded stud 625 is threaded. This conductive member is another connection point. When the threaded stud 625 and the conductive member are coupled together, the connection is completed. This is an example of a mechanical connection.

Figure 7:
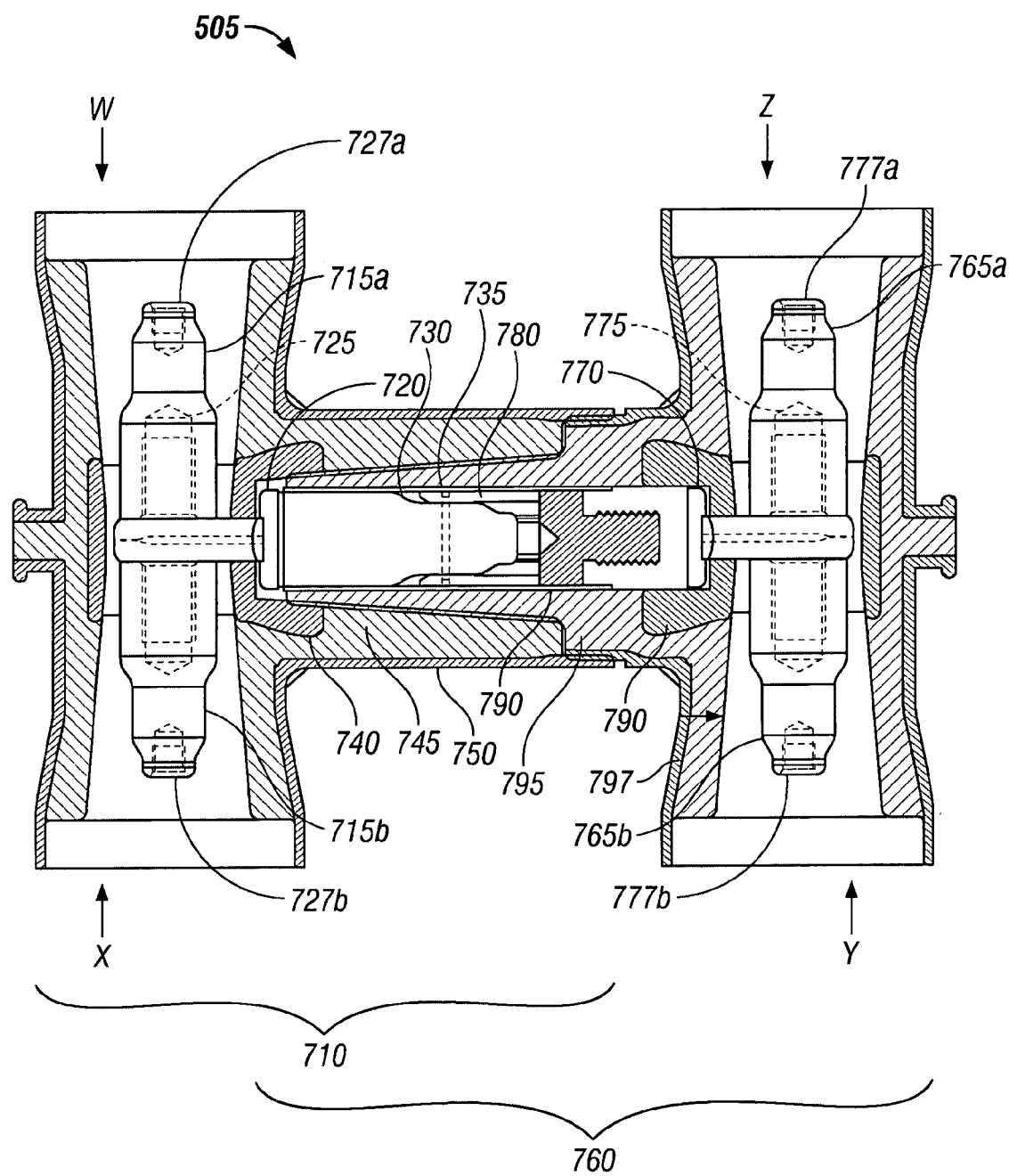
FIG. 7 is a cross-sectional view of a bus bar of the bus bar system of FIG. 5.
Figure 8:
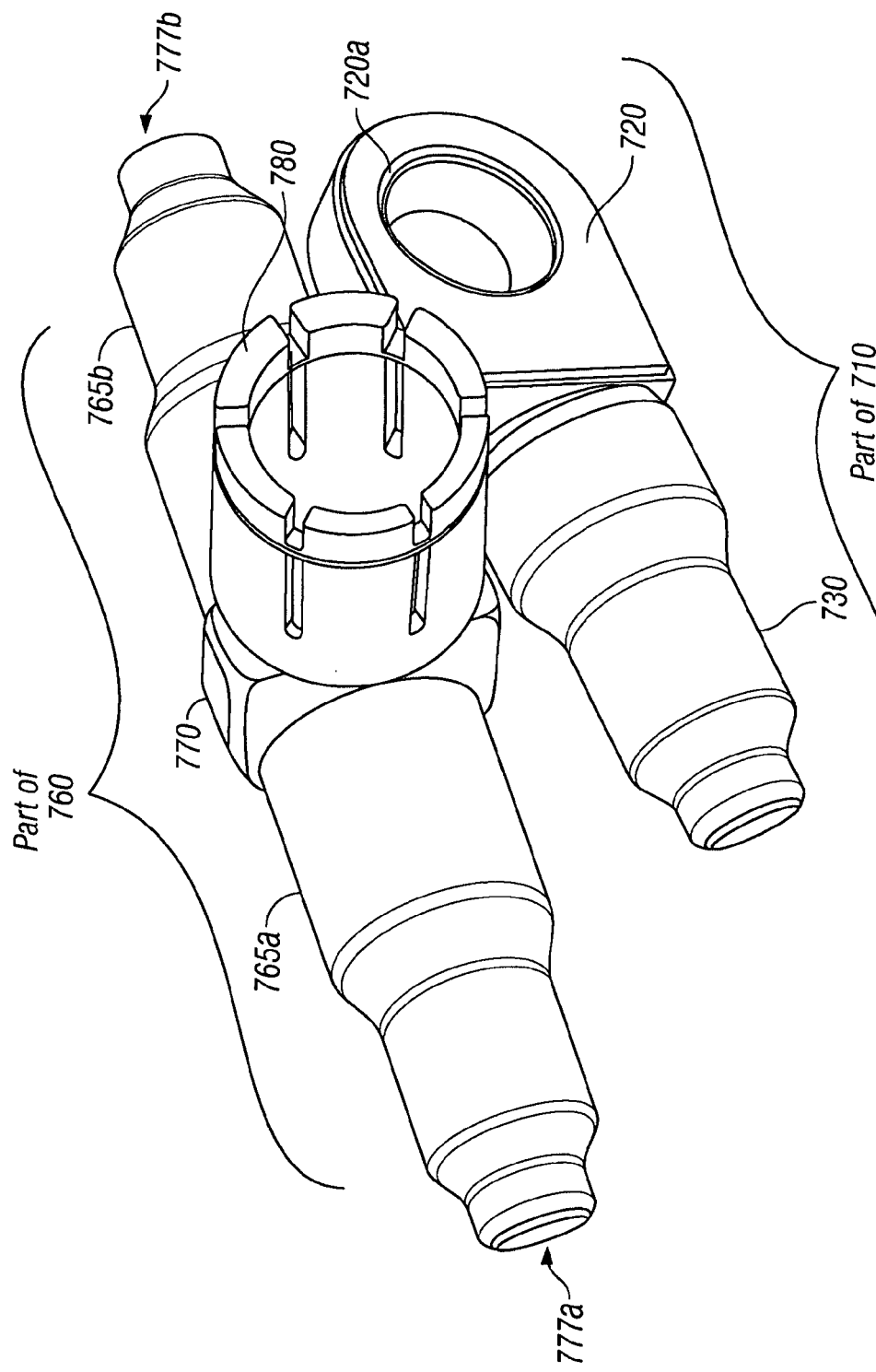
FIGS. 8 and 9 are perspective views of components of the bus bar of FIG. 7.

FIGS. 7 and 8 show a first exemplary implementation of bus bar 505. In this implementation, bus bar 505 includes two legs 710 and 760. Each leg 710 and 760 is a three-way "T" connector. These three-way connectors form electrical and physical connections with up to three other elements or devices.

Three-way connector 710 includes probes 715a, 715b and 730. Three-way connector 760 includes probes 765a and 765b and finger contact 780. Probes are elongated pieces of conductive material that are coupled to female finger contacts by pushing the two together. It should be noted that probes 715a and 715b are not shown in FIG. 8.

Three-way connectors 710 and 760 also include threaded studs 720 and 770, respectively. Each threaded stud includes an eye. Eye 720a in threaded stud 720 is shown in FIG. 8. Additional threaded studs 725 and 775 pass through the eyes of threaded studs 720 and 770, respectively. Probes 715a and 715b are threaded onto threaded stud 725, and probes 765a and 765b are threaded onto threaded stud 775. Each probe includes a hexagonal depression to receive a hexagonal wrench for tightening the probes onto their respective threaded studs. In particular, probe 715a includes depression 727a, probe 715b includes depression 727b, probe 765a includes depression 777a, and probe 765b includes depression 777b.

Three-way connector 710 includes three connection points for connecting three-way connector 710 to, for example, three-way connector 760. As shown in FIG. 7, the connecting point is a third probe 730. Probe 730 is threaded onto threaded stud 720. Three-way connector 760 includes another connection point used to connect the three-way connectors 710 and 760. The connection point included in three-way connector 760 is a female finger contact 780 that is threaded onto threaded stud 770. A female finger contact is a conductive device with a depression that is sized to receive a probe. As shown in FIG. 8, female finger contact 780 has, for example, six fingers. In other implementations, female finger contact 780 may include eight or any other number of fingers.

In FIG. 7, three-way connector 710 is joined to three-way connector 760 by connecting probe 730 to female finger contact 780. This is accomplished by pushing probe 730 into female finger contact 780. To reinforce the connection, a ring 735 made of spring material is placed in an outer groove of female finger contact 780. When probe 730 is inserted into female finger contact 780, ring 735 is stretched and holds the probe 730 in female finger contact 780. This is one way to form a push-on connection.

In the implementation shown in FIG. 7, each three-way connector 710 and 760 is made with its own protective sheathing and then the two pieces are coupled together to form bus bar 505. As shown in FIG. 7, protective sheathing for three-way connector 710 includes corona-shielding 740. Corona shielding 740 generally surrounds the points of physical connection between the various conductive elements and prevents arcing or electrical discharge. Insulating material 745 surrounds the corona shielding 740 and probes 715a, 715b and 730. In one implementation, this insulative material is ethylene propylene diene monomer ("EPDM") rubber. The insulative material 745 prevents current and voltage from being transmitted to the outer shell 750 from either the corona shielding 740 or the probes 715a, 715b and 730.

Outer shell 750 is a semi-conducting material and is typically coupled to ground so that any stray charges that are transmitted to the outer shell 750 are discharged to ground. By grounding stray charges, outer shell 750 offers additional protection for the bus bar system and the individuals who service it. Three-way connector 760 also includes corona shielding 790, an insulative material 795, and an outer shell 797. These elements are made of similar materials and perform similar functions to the corresponding elements of three-way connector 710. One difference between connector 710 and connector 760 is the physical dimensions of the insulative materials and outer shells around probe 730 and female finger contact 780. In particular, the insulative material 745 and outer shell 750 surrounding probe 730 have openings that are wide enough to accept the insulative material 795 and the outer shell 797 surrounding the female finger contact 780 (represented by the overlapping hash marks of 745 and 795 in FIG. 7). By sizing the insulative materials and outer shells in this way, the two three-way connectors can be coupled together with a friction fit between the insulative material 745 and the outer shell 750 of three-way connector 710 and the insulative material 795 and the outer shell 797 of three-way connector 760. It should be noted that the coupling of probe 730 to female finger contact 780 also aids in the coupling of connector 710 to connector 760.

Connections to elements external to bus bar 505 are made through the reception points w, x, y and z in insulative materials 745 and 795 and outer shells 750 and 797. Exemplary connections to bus bar 505 are to push the probes 715a, 715b, 765a and 765b onto bushings. The bushings include female finger contacts that are similar in structure to female finger contact 780 and are configured to accept the probes 715a, 715b, 765a and 765b. Thus, a connection between a bushing and bus bar 505 is similar to the connection between three-way connectors 710 and 760. It should be noted that alternative implementations of bus bar 505 use mechanical connections instead of any of the five push-on connections described. For example, probe 730 could be left off of threaded stud 720 and a conductive member with internal threads could be used to replace female finger contact 780. Leg 710 would be joined to leg 760 by turning the threaded stud 720 and the conductive member with respect to each other. Similarly, probes 715a, 715b and 765b could be removed leaving threaded studs 725 and 775 to accept internal threads of a conductive member for mechanical connections. Thus, the bus bar 505 could be manufactured with all push-on connections, all mechanical connections or a combination of both.

It should be noted that while elements 720, 730, 770 and 780 are shown in FIG. 7 as separate parts, in alternative implementations these separate parts could be manufactured as a single, integral part.

Figure 9:
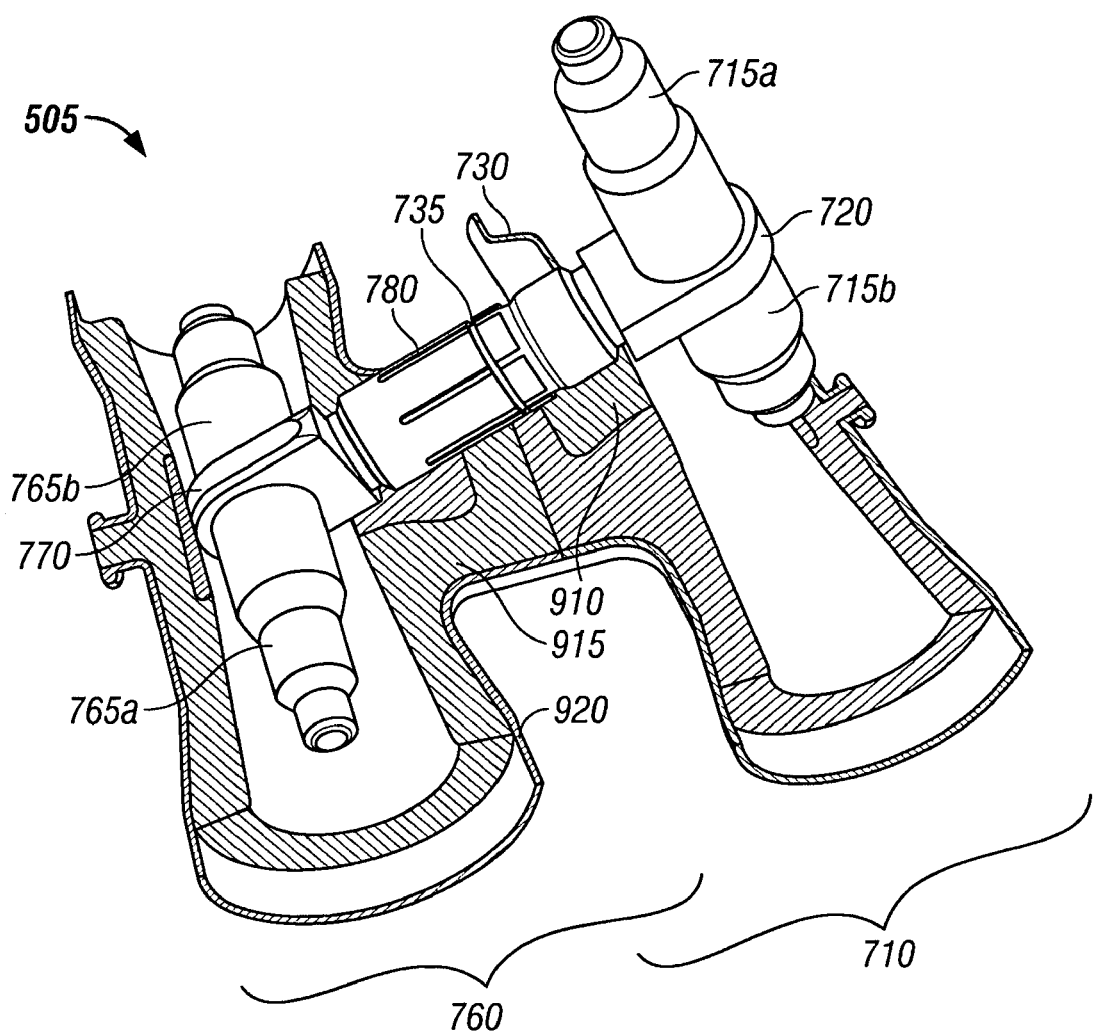

FIG. 9 shows another implementation of bus bar 505. The conductive elements are the same as previously described. However, instead of surrounding each of the three-way connectors with its own separate corona shield, insulative material and outer shell as previously described, legs 710 and 760 are coupled together and then encapsulated in one corona shield 910, one insulative material 915 and one outer shell 920.

FIG. 9 also shows how bus bar 505 can be oriented to place connection points in different planes. That is, a first set of connection points represented by probes 765a and 765b is in a different plane than a second set of connection points represented by probe 715a and 715b. This allows for the active switching elements to be oriented in different ways within the switchgear.

Figure 10:
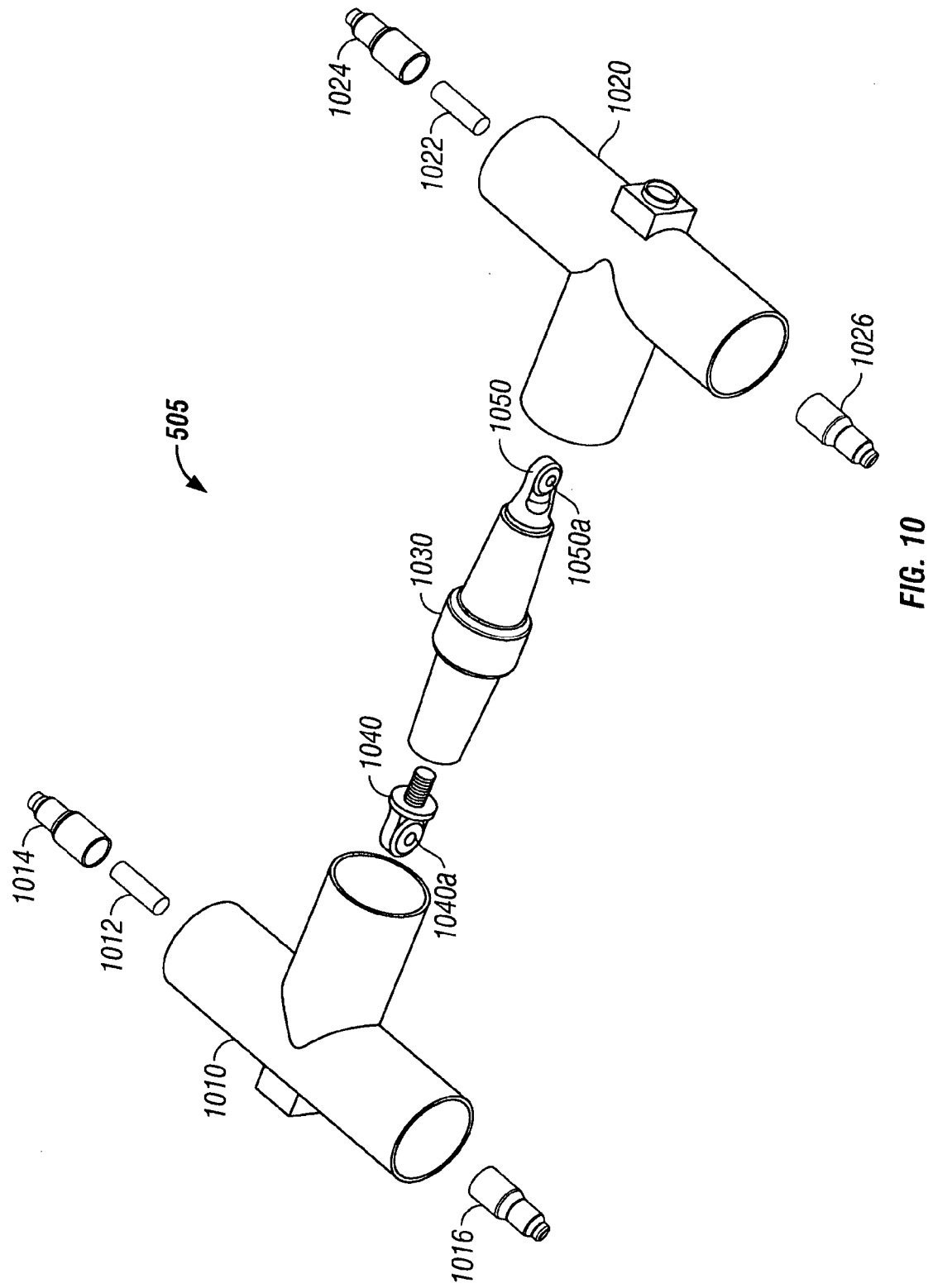
FIG. 10 is a perspective view of an alternative bus bar of the bus bar system of FIG. 5.
Figure 11:
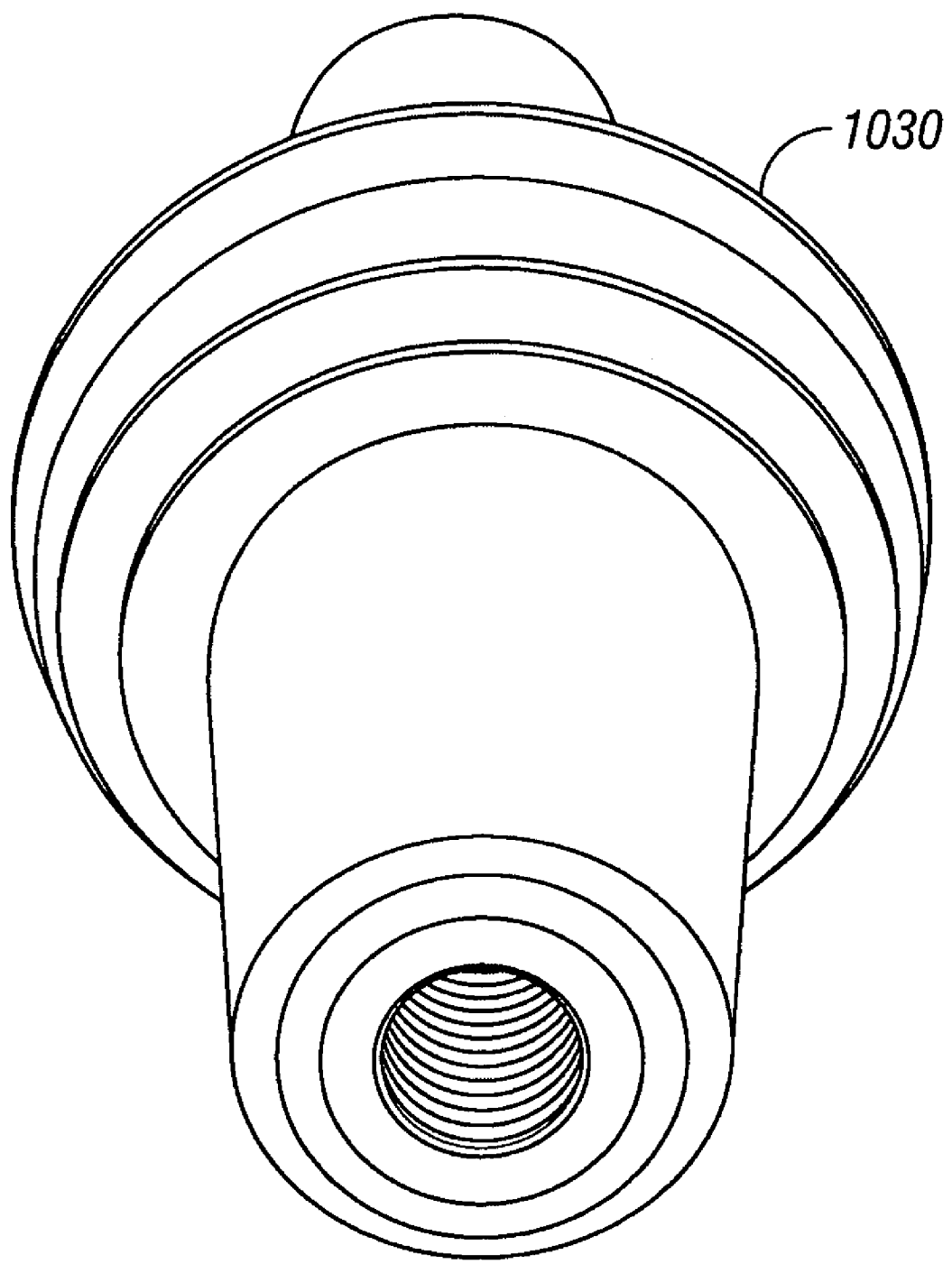
FIG. 11 is a perspective view of a component of the bus bar of FIG. 10.

FIGS. 10 and 11 show another implementation of bus bar 505. In this implementation, a single two-way connector 1030 includes threaded studs 1040 and 1050 that are connected, respectively, to three-way "Y" connectors 1010 and 1020, which are similar to connector 710 of FIG. 7. One such exemplary two-way connector 1030 is the 600 A connection plug manufactured by Cooper Power Systems. A description of this connection plug is provided in Cooper Power System's "Molded Rubber Products 600-46," the disclosure of which is incorporated by reference.

In this implementation, three separate components are assembled together to form the bus bar 505. Two of the components of bus bar 505 are the three-way "Y" connectors 1010 and 1020. Three-way connector 1010 receives a threaded stud 1012 and probes 1014 and 1016 that thread onto threaded stud 1012. Similarly, three-way connector 1020 receives a threaded stud 1022 and probes 1024 and 1026 that thread onto threaded stud 1022.

The third piece of the bus bar 505 is the two-way connector 1030, which includes two internal sets of threads, with one on each end of a conductive rod. One set of threads is shown in FIG. 11. These threads receive threaded studs 1040 and 1050, which include, respectively, eyes 1040a and 1050a. Threaded studs 1012 and 1022 pass through eyes 1040a and 1050a, respectively. Probes 1014, 1016, 1024 and 1026 are tightened onto threaded studs 1012 and 1022 so as to engage threaded studs 1040 and 1050 and thereby complete the electrical connections. It should be noted that alternative implementations of the bus bar 505 shown in FIG. 10 include removing any of the probes 1014, 1016, 1024 and 1026 and using conductive members with internal threads to make mechanical connections to the various active switching elements (not shown).

Figure 12:
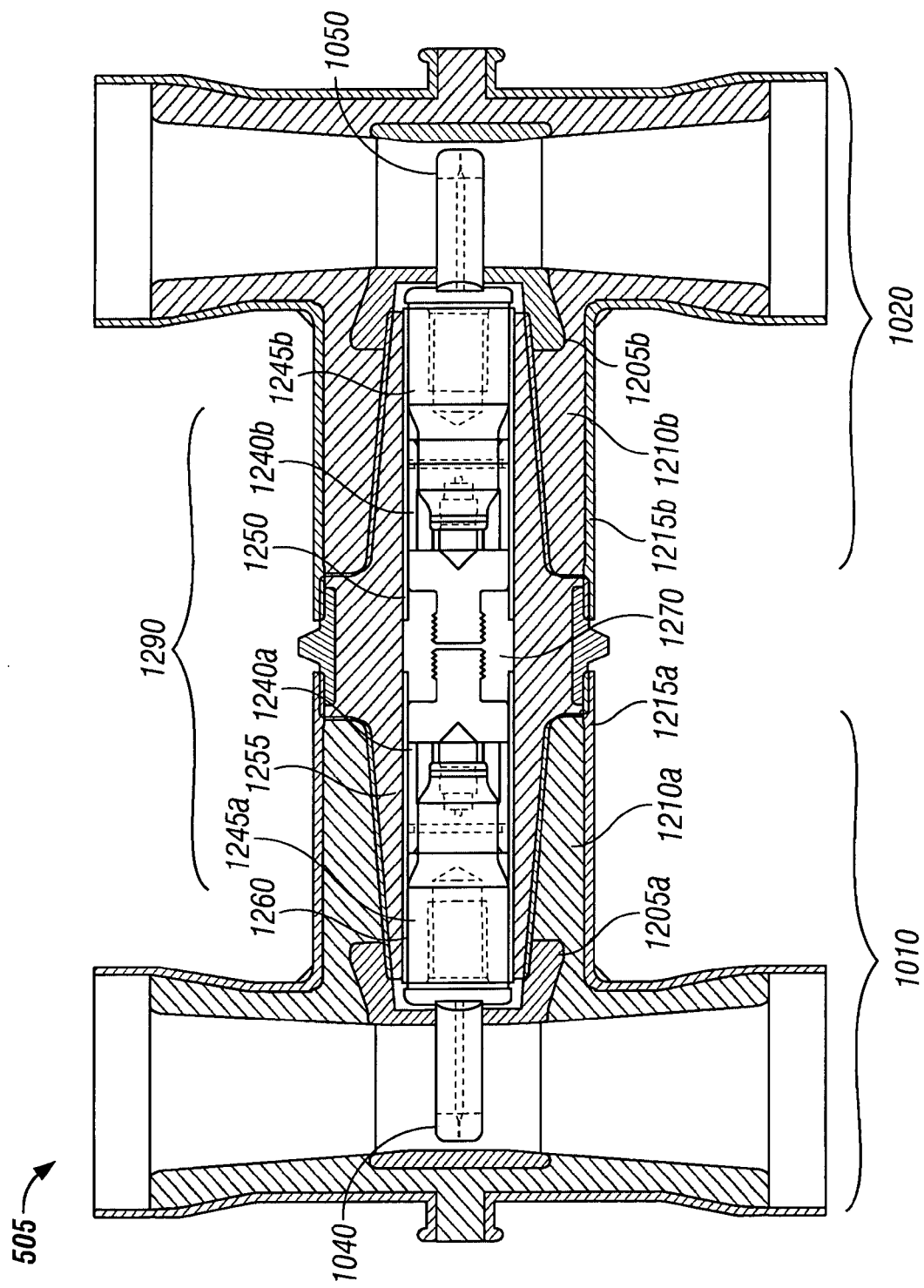
FIG. 12 is a cross-sectional view of an alternative to the bus bar of FIG. 10.

FIG. 12 shows another implementation of bus bar 505. Bus bar 505 includes three components 1010, 1020 and 1290. Components 1010 and 1020 were described with respect to FIG. 10. It should be noted that the probes 1014, 1016, 1024 and 1026 and the threaded studs 1012 and 1022 shown in FIG. 10 are included in the bus bar 505 of FIG. 12 but are not shown in FIG. 12. Threaded studs 1040 and 1050 are surrounded by corona shields 1205a and 1205b, respectively, which in turn, are surrounded by insulative materials 1210a and 1210b, respectively. Insulative materials 1210a and 1210b are surrounded by semi-conducting shells 1215a and 1215b, respectively. In general, these elements may be made of the same materials and perform the same functions as previously described.

The exemplary two-way connector 1290 shown in FIG. 12 includes two female finger contacts 1240a and 1240b threaded into a conductive base 1270. A variation of this element could include only one finger contact (1240a or 1240b) and a longer conductive base. These female finger contacts are coupled to probes 1245a and 1245b, which are threaded onto threaded studs 1040 and 1050, respectively. Corona shields 1260 and 1250 surround the finger contacts 1240a and 1240b, respectively, and the probes 1245a and 1245b. The corona shields 1260 and 1250 are surrounded by insulative material 1255 and a semi-conducting shell 1280. Corona shields 1260 and 1250, insulative material 1255 and shell 1280 maybe made of the materials previously noted and may function as previously described. The bus bar 505 shown in FIG. 12 is assembled by pushing the probes 1245a and 1245b of connectors 1010 and 1020, respectively, into the female finger contacts 1240a and 1240b of two-way connector 1290.

Figure 13:
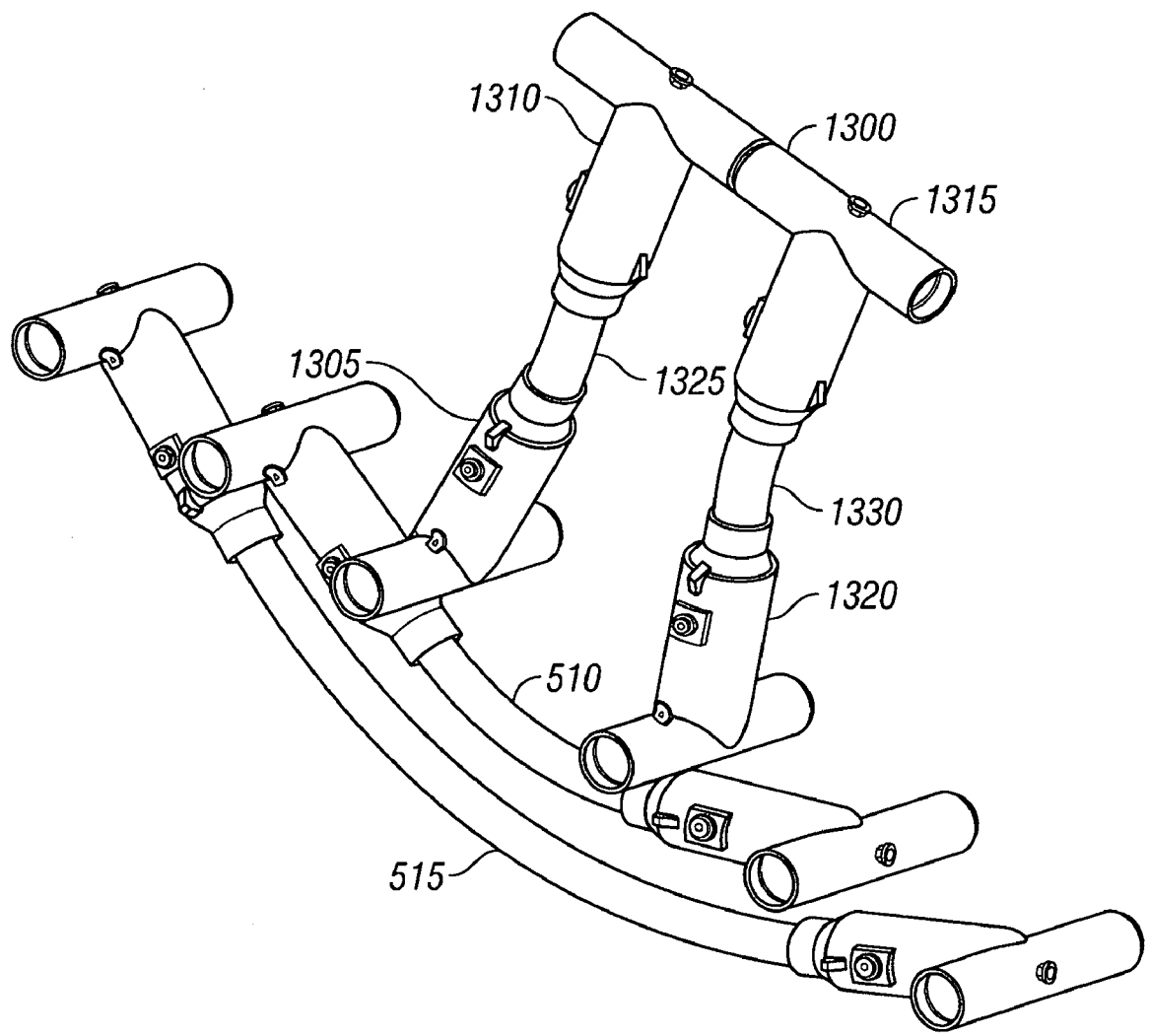
FIG. 13 is a perspective view of an alternative solid dielectric, modular, deadfront bus bar system.

FIG. 13 illustrates another exemplary bus bar system. The descriptions of bus bars 510 and 515 were previously provided in relation to the description of FIG. 5. Bus bar 1300 is constructed of four standard three-way connectors 1305, 1310, 1315 and 1320 and two cables 1325 and 1330. Three-way connectors 1305 and 1310 are coupled to cable 1325, and three-way connectors 1315 and 1320 are coupled to cable 1330. The structure of the three-way connectors and the connections between the three-way connectors and the cables are similar to those previously described. Three-way connector 1310 is coupled to three-way connector 1315 by two-way connector 1030, a threaded stud, or equivalent connecting device (not shown). Three-way connectors 1305, 1310, 1315 and 1320 may be implemented using the Bol-T connectors, catalog number 600-30 and 600-50 manufactured by Cooper Power Systems, the specifications of which are incorporated herein by reference.

Several observations can be made regarding the various implementations of the bus bar system. For example, the bus bar system is both modular and can be made from standard parts. That means that an individual can assemble a bus bar by simply cutting cables to the appropriate length and connecting those cables to the three-way connectors. This differs from conventional bus bar systems that include large copper or other metallic bars that must be formed or bent into a particular shape. The modularity provided by this bus bar system allows for easy manufacture of multiple configurations of switchgear. In addition, some of the parts used to construct the bus bar system are standard parts. More specifically, the threaded studs, probes and female finger contacts are used in other connectors (i.e., in the connectors used to connect the cables to the bushings on the switchgear). This means that a bus bar system may be assembled using standard parts.

Figure 1:
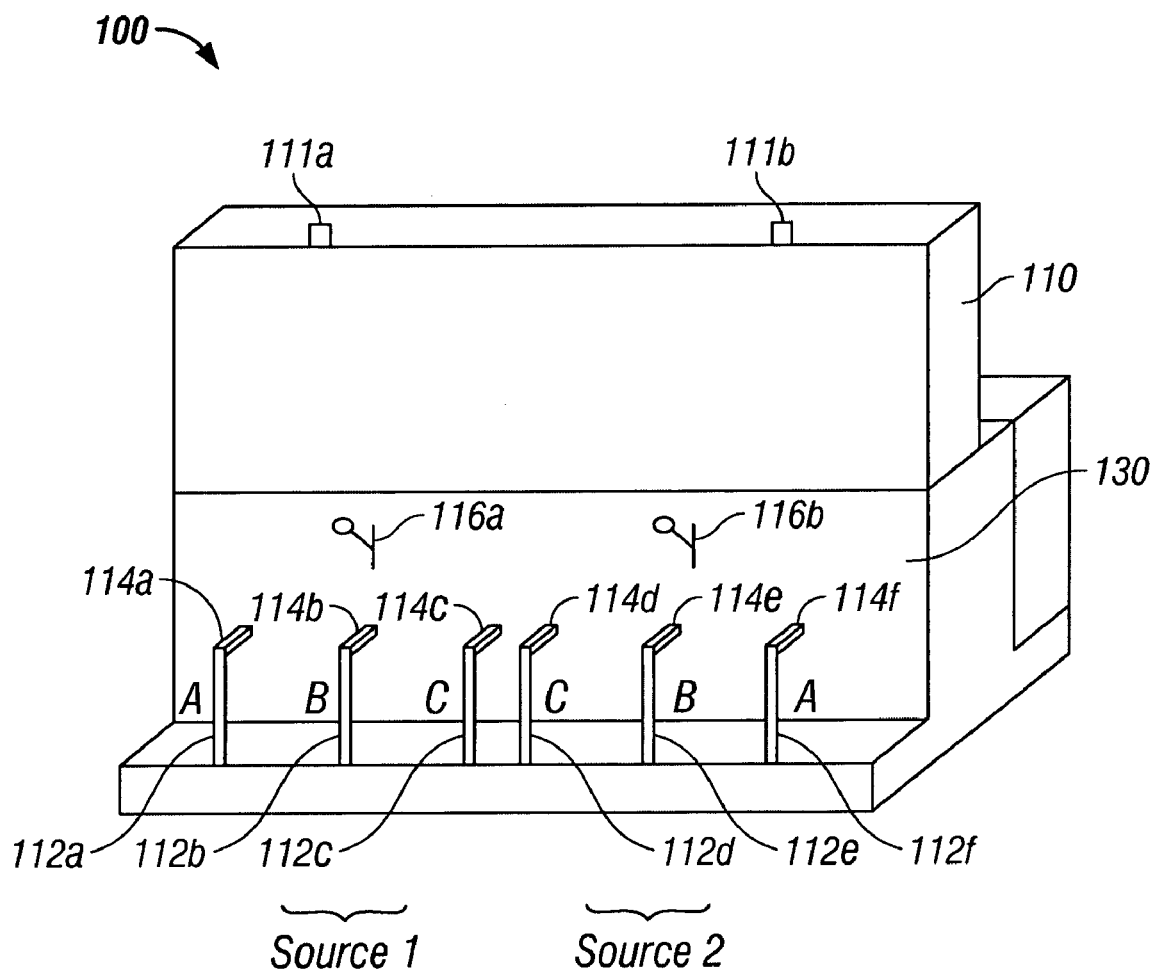
FIGS. 1 and 2 are perspective views of switchgear with open doors.
Figure 2:
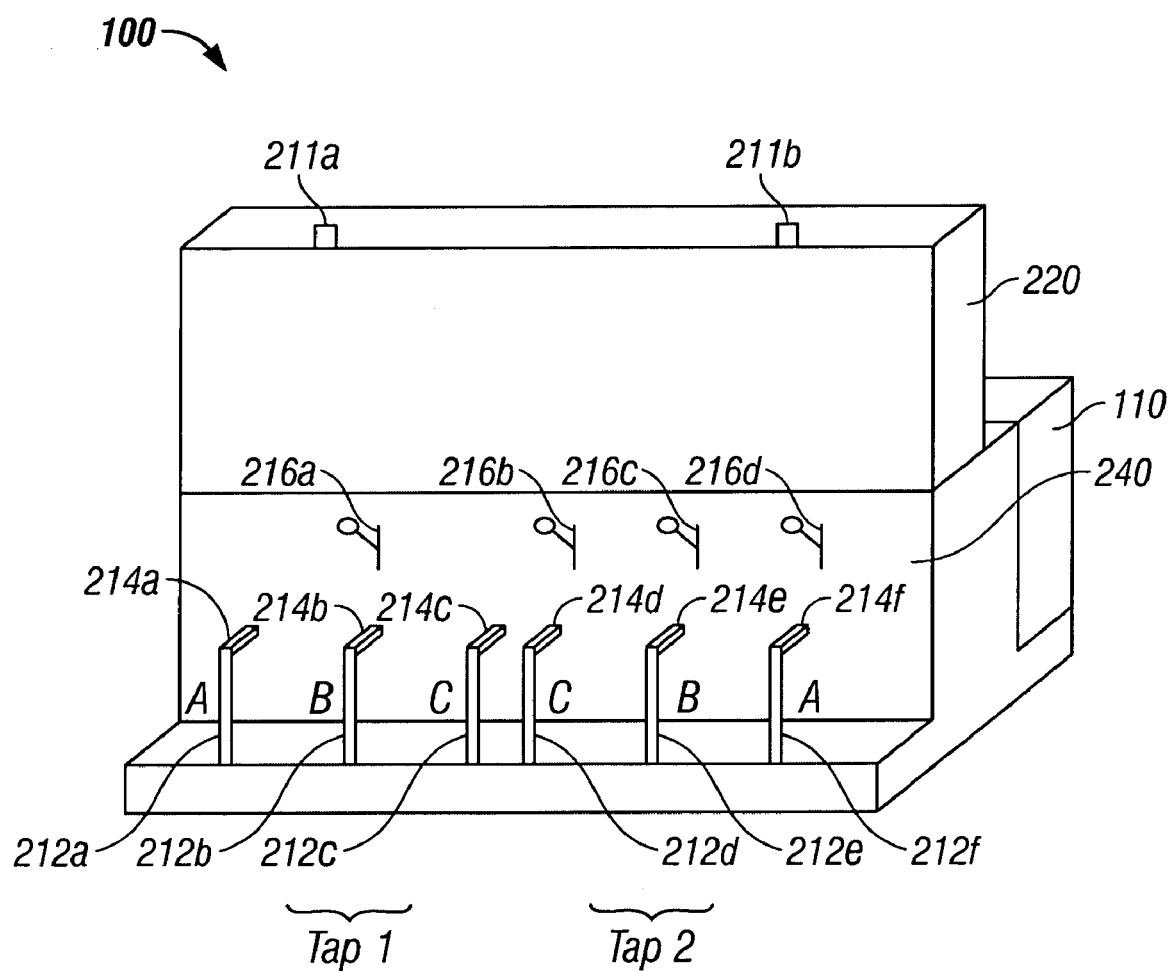
Figure 3:
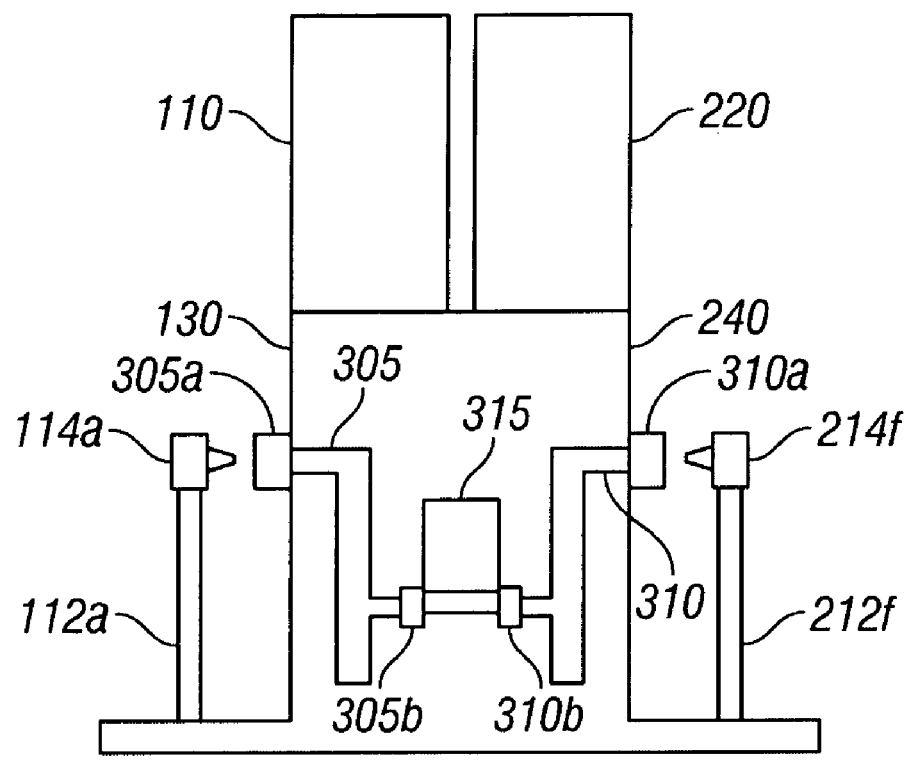
FIG. 3 is a cross-sectional view of internal parts of the switchgear of FIGS. 1 and 2.
Figure 4:
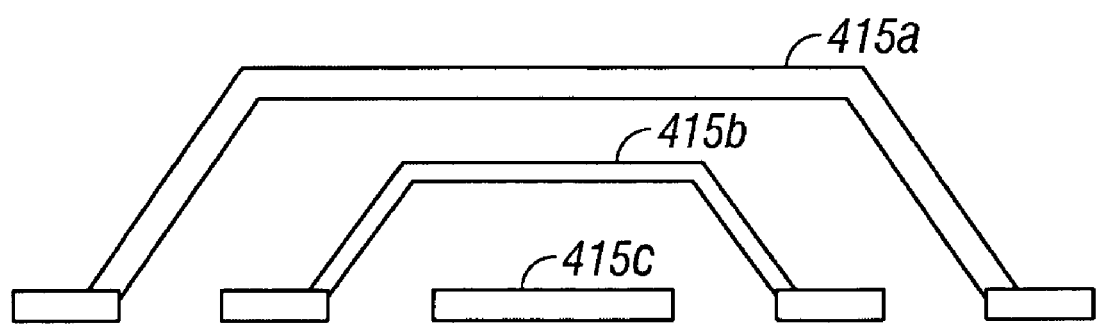
FIG. 4 is a plan view of the bus bar system of the switchgear of FIGS. 1-3.

As an example, switchgear may be built to fit a new specification or as a retrofit to replace existing switchgear. In general, existing switchgear is designed earlier with specific dimensions, such as height, width and depth, as well as the number of ways on the switchgear and location and spacing (i.e., distance) between the bushings on the front plates of the switchgear and orientation of the bushings to one another (i.e., a straight horizontal line as shown in FIGS. 1 and 2), all of which provide at least a portion of what is called a switchgear's specification. The new switchgear is manufactured either to fit into a new space, in which the specification is created anew, or to replace existing switchgear, in which case the specifications of the existing switchgear are determined by either taking measurements of the existing switchgear or by reading the data from the existing switchgear's associated data sheet. In either case, the manufacturer receives the specification and begins assembling the switchgear by collecting the first set of modules needed to build the first bus bar of the bus bar system for carrying one phase of power.

As an example, if the first bus bar is bus bar 1300 of FIG. 13, the manufacturer would collect four connecters (1305, 1310, 1315 and 1320) and two cables 1325 and 1330 of appropriate length, based upon the received specifications, as a first set of modules and couple these modules so as to form bus bar 1300. Active switching elements are then coupled to the bus bar. The type of active switching elements (e.g., fuse or switch) is determined by the received specification. The active switching elements are then mounted onto a frame so that a portion of each active switching element, for example a bushing, protrudes towards an exterior working space of the new switchgear, as previously described. After all of the required bus bars have been mounted, the internal space defined by the outer shell that encompasses the bus bar system and the active switching elements is left with air surrounding the bus bar system and active switching elements as opposed to other pieces of switchgear that may use oil or $SF_6$ to further insulate the bus bars from each other, the active switching elements, and the outer shell. The semiconductor shields on the bus bar and active switching elements are then coupled to a point on the switchgear that is later coupled to ground upon installation of the switchgear so as to make the switchgear completely deadfront. It should be noted that these steps may be performed in an alternative order depending on the specification of the switchgear as well as the manufacturer's capabilities.

Similarly, if a second bus bar is needed for the new switchgear, the manufacturer collects the modules needed and assembles them into the second bus bar. For example, if the second bus bar requires the reception points (the points on the bus bar where the bus bar is coupled to the active switching elements) to be further apart than on the first bus bar, the manufacturer collects two connectors and a longer cable into a second set of modules. These modules would then be assembled to form a second bus bar, like bus bar 505, 510 or 515 in FIG. 5, and coupled to the frame. If a third bus bar is required by the specifications, the manufacturer collects the required modules and assembles them into the third bus bar and coupled to the frame. It should also be noted that other bus bar systems can be built using any of the bus bars shown in FIGS. 5 and 7-12 instead of the bus bar 1300 shown in FIG. 13 as previously described. It should also be noted that alternative switchgear may be manufactured such that the space inside the outer shell of the switchgear is filled with an insulator other than air (e.g., EPDM).

It should be noted that the orientation of the bushings on the exterior of the new switchgear need not be limited to the horizontal line shown in FIGS. 1 and 2. For example, the new switchgear may have the bushings oriented in a straight vertical line, a sloping line, or multiple lines, may be co-planar or non-co-planar, and may even have the bushings on different exterior surfaces of the switchgear. As an example, the new switchgear may have some bushings mounted on a front-plate, as shown in FIGS. 1 and 2, and have some other bushings mounted onto the top surface of the switchgear (this surface not shown in FIGS. 1 and 2).

The modularity of the bus bar system allows for multiple configurations of the switchgear. For example, the bushings on the switchgear do not need to be in a line as shown in FIGS. 1 and 2. The modularity allows for bus bars, and therefore switchgear, to be manufactured so that the bushings can be oriented anywhere along either of the two front plates or the frame of the switchgear. In addition to the various orientations of the bushings to each other, the spacing between the bushings can be similarly varied. The modularity of the bus bar system allows for the bushings to be placed closer or further apart, depending on the needs of the customer. Similarly, the number of bushings is not limited to the number of bushings described in FIGS. 1 and 2. That is, a bus bar system can easily be manufactured to accommodate any number of bushing on the switchgear. Similarly, bus bar systems and associated switchgear may be created to support a single source and single tap system. Other configurations may support three or more source and tap systems.

Also, a bus bar 505 can be assembled in multiple ways using the parts at hand. For example, the three-way connector 710 in FIG. 7 is identical to the three-way connector 1010 in FIG. 10. Thus, a maintenance or operating person who is replacing the bus bar 505 can use parts on hand to make either the bus bar 505 shown in FIG. 7 or 10 or the bus bar 1300 shown in FIG. 13. Also, by using probes and finger contacts, bus bar 505 is push-on connectable. This means that the assembly, maintenance or operating person does not need to use wrenches to disconnect the active switching elements from the bus bar system.

In addition, the bus bar systems of FIGS. 5-13 provide additional safety beyond conventional bus bar systems. Implementations that include a semi-conductive outer shell coupled to ground prevent the area surrounding the bus bar systems from collecting stray charge that could damage the components or harm a person who may make incidental contact with the switchgear. In these types of implementations, the construction of the switchgear can be modified. That is, in conventional dead-front switchgear, the switchgear includes a container that is made of a conductive outer shell. The front plates form a part of this container. However, in implementations where the semi-conductive outer shells of the components of the bus bar system are coupled to ground, there is no need for the outer container to be part of the switchgear and coupled to ground. The bus bar and active switching element(s) system themselves are deadfront such that the switchgear does not need an external container coupled to ground. In such implementations, the dead front bus bar system may be surrounded with solid insulation to protect it and avoid contamination, and the metal container of the convention switchgear is not used. Thus, by making the bus bar system itself dead front, switchgear can be developed where the outer container or outer surface of the switchgear need not be coupled to ground, yet the switchgear is still dead front.

The bus bar system shown in FIGS. 5-13 may be implemented in any type of switchgear, such as those that use, $SF_6$ or air as insulation. In certain implementations, the bus bar systems of FIGS. 5-13 are implemented in switchgear containing solid insulation. One type of solid insulation is ethylene propylene diene monomer (EPDM) rubber. This solid insulation has a higher dielectric strength constant than oil, air or $SF_6$, which means that a certain amount of solid insulation provides more insulation between the bus bars than the same amount of oil, $SF_6$ or air. By using materials with stronger dielectric constants, the various bus bars 505 or 1300 and 510 and 515 can be placed close together such that the overall size of the switchgear can be reduced.

Switchgear containing solid insulation attributes provides several advantages over conventional switchgear. First, switchgear made with solid insulation can be made smaller than conventional switchgear, which allows the switchgear to be installed in a less conspicuous manner. It should be noted that switchgear using solid insulation need not be made smaller, but can be manufactured to the same size as conventional switchgear to allow for older switchgear to be replaced on the same mounting surface without having to, for example, pour new concrete slabs or, more significantly, to realign or lengthen (by splicing) or replacing underground cables to get them to connect to the new bushing locations on the new piece of switchgear.

The combination of the modularity of bus bars 505, 1300, 510 and 515 and the insulative properties of solid insulation allow for the inexpensive and fast construction of new switchgear with dimensions smaller than conventional switchgear.

Many alternative implementations to the implementations previously described also may be made. For example, instead of using push-on connections (e.g., probes and female finger contacts), the connections to the various bus bars may be made using mechanical connections. While this variation makes replacing parts of the switchgear much more difficult as the technician or assembler must screw and unscrew replacement parts from the bus bars, this alternative bus bar system still uses modular parts that allow for quick and easy assembly of individual bus bars.

Another alternative includes reversing the relative positions of the probes with the female finger contacts. That is, instead of mounting bushings that include female finger contacts onto the active switching elements and probes into the connectors of the bus bars, an alternative implementation mounts probes onto the active switching elements and the female finger contacts onto the connectors of the bus bars.

While probes, threaded studs and female finger contacts are typically made of copper and copper alloys, it is also known that other metals, alloys or compounds may be used to form the conductive components of the bus bar system. In addition, while the general shapes of the female finger contacts and probes are cylindrical, other geometrical shapes are possible. It is also understood that the probes, female finger contacts and threaded studs described herein may be of various sizes that may or may not comply with industry, voluntary, international or otherwise accepted standards. The bus bar system described herein also allows for flexibility in orienting the plane or planes of the bushings. That is, switchgear 100 shown in FIGS. 1 and 2 has its bushings (covered by connectors 114*a*-114*b* and 214*a*-214*f*) in a plane parallel to the pad on which the switchgear 110 rests. The bus bar system shown in FIGS. 5 and 13 do not necessarily have to have co-planar, and horizontal, bus bars.

Also, the bus bars of the various bus bar systems of FIGS. 5-13 do not require corona shielding, insulation and outer shells. In these implementations, just the conductive elements are used to assemble the various bus bars. The bus bars are then encapsulated in air, oil or $SF_6$ insulation inside the switchgear.

While the implementations described above are for 4W connections, it should be understood that other implementations are possible. For example, threaded stud 770 could have a second set of threads attached to the eye and extending to the right of the figure. This extension of threads would accept a female finger contact to then accept a third leg to make a 6W bus bar. Similarly, bus bar 505 could accept a third leg, identical to leg 760, that is coupled to probe 765 to create a 5W bus bar. This 5W bus bar implementation emphasizes the modularity of the system and the interconnectability of standard parts to design a bus bar of any size, as well as the flexibility in orientation of the planes of connections.

Other implementations of the bus bars themselves are also possible with the components and techniques described herein. For example, other types of connectors, such as a two-way connection, are also possible. Referring again to FIG. 7, leg 710 can be modified to make a two-way connector by eliminating threaded stud 720, the probe 730 and the associated protrusion of corona shield 740, insulation 745 and protective sheathing 750. Threaded stud 725 is secured inside leg 710. One way of securing threaded stud 725 into leg 710 is to have insulation around the center portion of threaded stud 725 so as to form a friction fit with the remaining elements of this modified leg 710. Once secured, the probes 715a and 715b are threaded onto the threaded stud 725. This two-way connector can be used as a bus bar by coupling two active switching elements to probes 715a and 715b. It should also be noted that this two-way connector may use two mechanical connections or female finger contacts instead of the probes previously described. In addition, the two-way connector may have one mechanical connection and one push-on connection. It should also be noted that the two-way connector 1030 of FIG. 10 and the two-way connector 1290 of FIG. 12 could also be implemented, without the three-way connectors 1010 and 1020, as bus bars. It should be noted that the these bus bars using only a two-way connector may be implemented using two mechanical connections, two push-on connections or one of each.

Other implementations are within the scope of the following claims.

What is claimed is:

1. A deadfront switchgear comprising:
a first active switching element; and
a first bus bar coupled to the first active switching element, the first bus bar including at least a first conductive module having a first connection point connected to and contacting the first active switching element and a second connection point configured to connect to and contact a second active switching element, and a second conductive module having at least a third connection point configured to be connected to and contact at least a third active switching element, with the first conductive module and the second conductive module each comprising a conductive material surrounded by solid insulation and by a semi-conducting shield,
wherein at least one of the first conductive module and the second conductive module comprises a push-on connection point, and
wherein the first bus bar and the first active switching element are arranged such that the switchgear is deadfront in that it has no voltage on its exposed surfaces.

2. The deadfront switchgear of claim 1 further comprising a second active switching element, wherein the first bus bar is coupled to the first active switching element by a push-on connection and is coupled to the second active switching element by a mechanical connection.

3. The deadfront switchgear of claim 1 wherein the second connection point comprises a push-on connection point.

4. The deadfront switchgear of claim 1 wherein the first bus bar further comprises a cable and the first conductive module comprises a connector coupled to a first end of the cable.

5. The deadfront switchgear of claim 4 wherein the connector further comprises a push-on connection point for coupling to the first active switching element.

6. The deadfront switchgear of claim 5 wherein the push-on connection point comprises a probe.

7. The deadfront switchgear of claim 4 wherein the connector further comprises a mechanical connection point for coupling to the first active switching element.

8. The deadfront switchgear of claim 7 wherein the mechanical connection point comprises a threaded stud.

9. The deadfront switchgear of claim 4 further comprising a second bus bar and an additional active switching element coupled to the second bus bar, wherein the second bus bar comprises a second conductor and a second connector surrounded by insulation and by a semiconducting shield.

10. The deadfront switchgear of claim 9 wherein the first connector further comprises a push-on connection point for coupling to the first active switching element.

11. The deadfront switchgear of claim 9 wherein the first connector further comprises a mechanical connection point for coupling to the first active switching element.

12. The deadfront switchgear of claim 10 wherein the second connector further comprise a push-on connection point for coupling to the additional active switching element.

13. The deadfront switchgear of claim 10 wherein the second connector further comprises a mechanical connection point for coupling to the additional active switching element.

14. The deadfront switchgear of claim 1 further comprising the second active switching element wherein the second active switching element is coupled to the first bus bar.

15. The deadfront switchgear of claim 14 further comprising a switchgear housing that contains the first bus bar and includes a surface to which the first active switching element is coupled, wherein the second active switching element is coupled to the surface of the switchgear housing.

16. The deadfront switchgear of claim 14 further comprising a switchgear housing that contains the first bus bar and includes a surface to which the first active switching element is coupled, wherein the second active switching element is coupled to a second surface of the switchgear housing.

17. The deadfront switchgear of claim 14 further comprising the third active switching element wherein the third active switching element is coupled to the first bus bar.

18. The deadfront switchgear of claim 17 further comprising a switchgear housing that contains the first bus bar and includes a surface to which the first active switching element is coupled, wherein the second and third active switching elements are coupled to a second surface of the switchgear housing.

19. A high voltage bus bar comprising:
a first leg comprising:
a first conductive structure that provides a first connection point, a second connection point, and a third connection point,
first insulation surrounding the first, second and third connection points, and a first semiconductor shield surrounding the first insulation; and
a second leg comprising:
a second conductive structure that provides a fourth connection point, a fifth connection point, and a sixth connection point,
second insulation surrounding the fourth, fifth and sixth connection points, and
a second semiconductor shield surrounding the second insulation,
wherein the first leg is coupled to the second leg by coupling the first and fourth connection points together, and
wherein at least one of the connection points comprises a push-on connection point.

20. The high voltage bus bar of claim 19 wherein the second and fifth connection points are in different planes.

21. The high voltage bus bar of claim 19 further comprising a third leg comprising:
a seventh connection point;
an eighth connection point;
a ninth connection point;
third insulation; and
a third semiconductor shield surrounding the seventh, eighth and ninth connection points;
wherein the second leg is coupled to the third leg by coupling the sixth and seventh connection points.

22. The high voltage bus bar of claim 19, wherein the first semiconductor shield and the second semiconductor shield are coupled together and to electrical ground.

23. The high voltage bus bar of claim 19 wherein the second connection point is a part of a second push-on connection and the fifth connection point is a part of a mechanical connection.

24. The high voltage bus bar of claim 23 wherein the second connection point comprises a probe and the fifth connection point comprises a threaded stud.

25. The high voltage bus bar of claim 19 wherein the second and fifth connection points define a plane.

26. The high voltage bus bar of claim 25 where the plane is not vertical.

27. The high voltage bus bar of claim 19 wherein the first and fourth connection points each comprises a push-on connection point such that a connection between the first and fourth connection points comprises a first push-on connection.

28. The high voltage bus bar of claim 27 wherein the first connection point comprises a probe and the fourth connection point comprises a female finger contact.

29. The high voltage bus bar of claim 27 wherein the second and fifth connection points comprise, respectively, a second and a third push-on connection point.

30. The high voltage bus bar of claim 27 wherein the second and fifth connection points comprise, respectively, a first and a second mechanical connection point.

31. The high voltage bus bar of claim 19 wherein the first and fourth connection points comprise a mechanical connection.

32. The high voltage bus bar of claim 31 wherein the first connection point comprises a threaded stud and the fourth connection point comprises a conductive member with internal threads.

33. The high voltage bus bar of claim 31 wherein the second and fifth connection points are parts of push-on connections.

34. The high voltage bus bar of claim 31 wherein the second and fifth connection points are parts of additional mechanical connections.

35. The high voltage bus bar of claim 31 wherein the second connection point comprises a probe and the fifth connection point comprises a threaded stud.

36. A high voltage bus bar contained within a switchgear housing, the bus bar comprising:
a first leg comprising:
a first connection point;
a second connection point positioned and configured to connect with a first active switching element located at a first side of the switchgear housing; and
a third connection point positioned and configured to connect with a second active switching element located at a second side of the switchgear housing opposite the first side of the switchgear housing; and
a second leg comprising:
a fourth connection point;
a fifth connection point positioned and configured to connect with a third active switching element located at the first side of the switchgear housing; and
a sixth connection point positioned and configured to connect with a fourth active switching element located at the second side of the switchgear housing;
wherein the first leg is coupled to the second leg by coupling the first and fourth connections points together.

37. The high voltage bus bar of claim 36 wherein the second and fifth connection points are in different planes.

38. The high voltage bus bar of claim 36 further comprising a third leg comprising:
a seventh connection point;
an eighth connection point; and
a ninth connection point;
wherein the second leg further is coupled to the third leg by coupling the fifth and seventh connection points together.

39. The high voltage bus bar of claim 36 wherein the second connection point is part of a second push-on connection and the fifth connection point is part of a mechanical connection.

40. The high voltage bus bar of claim 39 wherein the second connection point comprises a probe and the fifth connection point comprises a threaded stud.

41. The high voltage bus bar of claim 36 wherein the second and fifth connection points define a plane.

42. The high voltage bus bar of claim 41 wherein the plane is not vertical.

43. The high voltage bus bar of claim 36 wherein the first and fourth connection points comprise a first push-on connection.

44. The high voltage bus bar of claim 43 wherein the first connection point comprises a probe and the fourth connection point comprise a female finger contact.

45. The high voltage bus bar of claim 43 wherein the second and fifth connection points are parts of additional push-on connections.

46. The high voltage bus bar of claim 43 wherein the second and fifth connection points are parts of mechanical connections.

47. The high voltage bus bar of claim 36 wherein the first and fourth connection points comprise a mechanical connection.

48. The high voltage bus bar of claim 47 wherein the first connection point is a threaded stud and the fourth connection point is a conductive member with internal threads.

49. The high voltage bus bar of claim 47 wherein the second and fifth connection points are parts of push-on connections.

50. The high voltage bus bar of claim 47 wherein the second and fifth connection points are parts of additional mechanical connections.

51. The high voltage bus bar of claim 47 wherein the second connection point comprises a probe and the fifth connection point comprises a threaded stud.

52. A method of assembling a switchgear, the method comprising:
receiving specifications about the switchgear;
assembling a first set of bus modules to form a first bus bar in accordance with the specifications, the first set of bus modules including at least a first conductive module having first and second connection points configured to be connected to and to contact first and second active switching elements and a second conductive module having at least a third connection point configured to be connected to and to contact at least a third active switching element;
coupling the first connection point of the first bus bar to the first active switching element; and
mounting the first active switching element onto a frame.

53. The method of claim 52 wherein the specifications received correlate to an existing switchgear and the new switchgear is assembled so as to replace the existing switchgear.

54. The method of claim 52 wherein the specifications received include data about a way.

55. The method of claim 52 wherein:
the first set of bus modules comprises a cable; and
the assembling of the first set of bus modules to form a first bus bar comprises coupling the cable to the first conductive module.

56. The method of claim 52 wherein the first conductive module further comprises:
first insulation surrounding the connection points; and
a first semiconductor shield surrounding the first insulation.

57. The deadfront switchgear of claim 52 wherein at least one of the connection points comprises a push-on connection point.

58. The method of claim 52 further comprising:
assembling a second set of bus modules to form a second bus bar in accordance with the specifications;
coupling the second bus bar to a fourth active switching element; and mounting the fourth active switching element onto the frame.

59. The method of claim 58 further comprising
assembling a third set of bus modules to form a third bus bar in accordance with the specifications;
coupling the third bus bar to a fifth active switching element; and
mounting the fifth active switching element onto the frame.

60. The method of claim 58 wherein:
the second bus bar includes a fourth connection point for coupling the second bus bar to the fourth active switching element; and
the specifications received include data about a spacing between the first connection point and the fourth connection point.

61. The method of claim 58 wherein:
the second bus bar includes a fourth connection point for coupling the second bus bar to the fourth active switching element; and
the specifications received include data that describes an orientation of the first connection point with respect to the fourth connection point.

62. The method of claim 61 wherein the orientation is substantially horizontal.

63. The method of claim 61 wherein the orientation is substantially vertical.

64. The method of claim 61 wherein the orientation is a slope with respect to a horizontal plane.

65. The method of claim 52 wherein assembling of the first set of bus modules to form the first bus bar comprises:
providing the first conductive module as a first leg comprising:
the first connection point;
the second connection point;
a fourth connection point;
first insulation surrounding the first, second and fourth connection points; and
a first semiconductor shield surrounding the first insulation;
providing the second conductive module as a second leg comprising:
the third connection point;
a fifth connection point;
a sixth connection point;
second insulation surrounding the third, fifth and sixth connection points; and
a second semiconductor shield surrounding the second insulation; and
coupling the first leg to the second leg by coupling the fourth and the fifth connection points together.

66. The method of claim 65 wherein the fourth and fifth connection points comprise a first push-on connection so that assembling the first set of bus modules to form the first bus bar comprises pushing the fifth connection point into the fourth connection point.

67. The method of claim 65 wherein the fourth and fifth connection points comprise a mechanical connection so that assembling the first set of bus modules to form the first bus bar comprises threading the fifth connection point onto the fourth connection point.

68. A switchgear comprising:
a first bus bar comprising a first set of bus modules assembled together so as to form the first bus bar, the first bus bar being assembled in conformance with a set of specifications, and the first set of bus modules including at least a first conductive module having first and second connection points configured to be connected to and to contact first and second active switching elements and a second conductive module having at least a third connection point configured to be connected to and to contact at least a third active switching element;
a first active switching element coupled to the first connection point of the first bus bar;
a frame to which the first active switching element is coupled; and
first solid insulation surrounding the first bus bar and the first active switching element.

69. The switchgear of claim 68 wherein the first conductive module further comprises:
first insulation surrounding the connection points; and
a first semiconductor shield surrounding the first insulation.

70. The switchgear of claim 68 wherein the specifications correlate to an existing switchgear such that the new switchgear is assembled so as to replace the existing switchgear.

71. The switchgear of claim 70 wherein the specifications correlate to a way.

72. The switchgear of claim 68 further comprising:
a second bus bar comprising a second set of bus modules assembled together so as to form the second bus bar, the second bus bar being assembled in conformance with the set of specifications; and
a fourth active switching element coupled to the second bus bar and the frame;
wherein the first solid insulation surrounds the second bus bar and the fourth active switching element.

73. The switchgear of claim 72 further comprising:
a third bus bar comprising a third set of bus modules assembled together in conformance with the set of specifications so as to form the third bus bar; and
a fifth active switching element coupled to the third bus bar and the frame;
wherein the first solid insulation surrounds the third bus bar and the fifth active switching element.

74. The switchgear of claim 72 wherein:
the second bus bar includes a fourth connection point for coupling the second bus bar to the fourth active switching element; and
the specifications include data that describes a spacing between the first connection point and the fourth connection point.

75. The switchgear of claim 72 wherein:
the second bus bar includes a fourth connection point for coupling the second bus bar to the fourth active switching element; and
the specifications include data that describes an orientation of the first connection point with respect to the fourth connection point.

76. The switchgear of claim 75 wherein the orientation is substantially horizontal.

77. The switchgear of claim 75 wherein the orientation is substantially vertical.

78. The switchgear of claim 75 wherein the orientation is a slope with respect to a horizontal plane.

79. The switchgear of claim 68 wherein the first set of bus modules comprises a cable.

80. The switchgear of claim 68 wherein the first set of bus modules comprises:
the first conductive module including a first leg comprising:
the first connection point;
the second connection point;
a fourth connection point;
first insulation surrounding the first, second and fourth connection points; and
a first semiconductor shield surrounding the first insulation; and
the second conductive module including a second leg comprising:
the third connection point;
a fifth connection point;
a sixth connection point;
second insulation surrounding the third, fifth and sixth connections points; and
a second semiconductor shield surrounding the second insulation;
wherein the first leg is coupled to the second leg by coupling the fourth and the fifth connection points together.

81. The switchgear of claim 80 wherein the fourth and fifth connection points comprise a first push-on connection so that the first leg is coupled to the second leg by pushing the fifth connection point into the fourth connection point.

82. The switchgear of claim 80 wherein the fourth and fifth connection points comprise a mechanical connection so that the first leg is coupled to the second leg by threading the fifth connection point onto the fourth connection point.

* * * * *